United States Patent Office 3,488,876
Patented Jan. 13, 1970

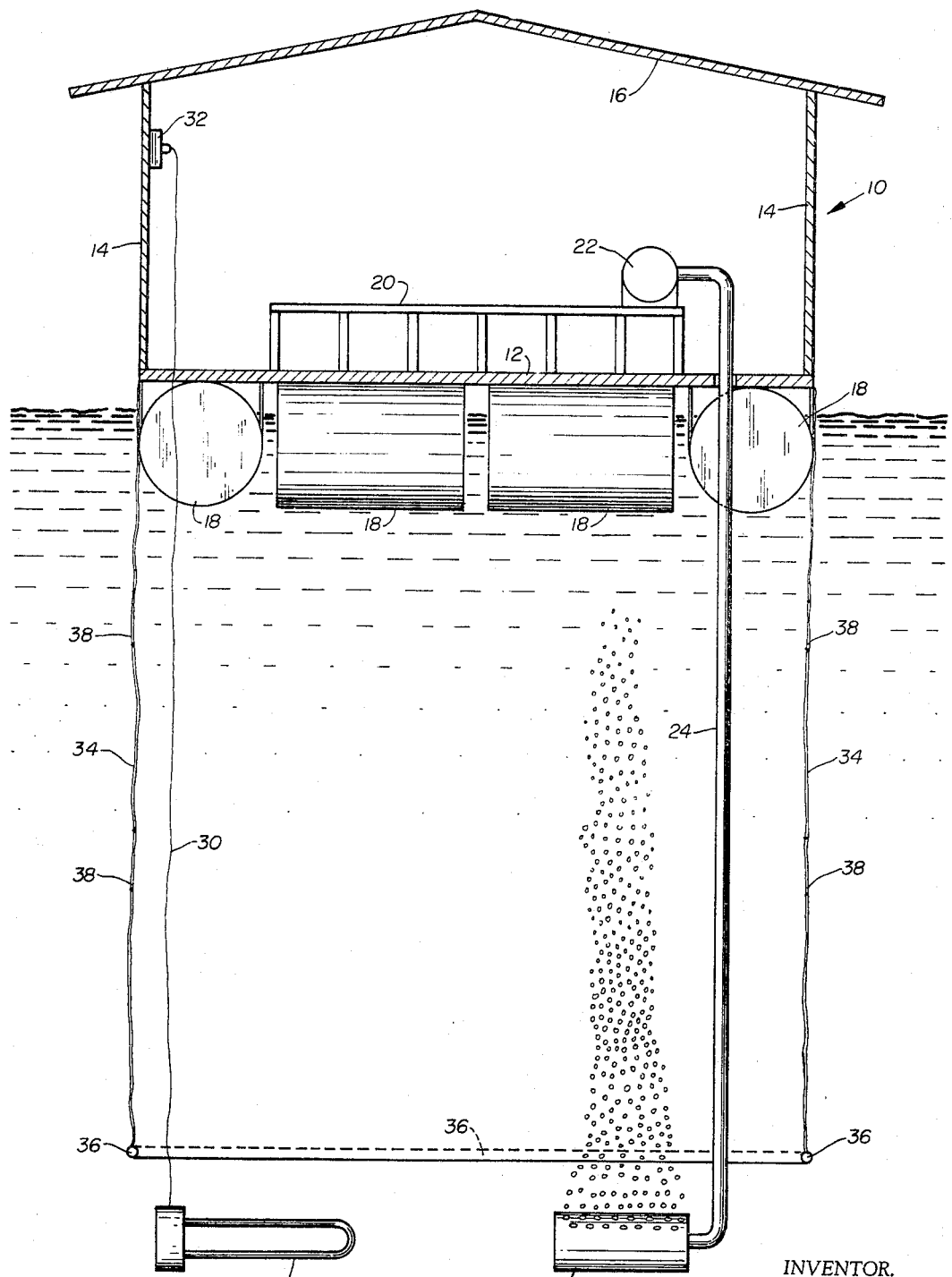

3,488,876
METHOD AND APPARATUS FOR IMPROVING FISHING UNDER A FISHING DOCK
Carl J. Lowrance, 6127 E. 46th St. S.,
Tulsa, Okla. 74135
Filed Feb. 29, 1968, Ser. No. 709,309
Int. Cl. A01k 79/02
U.S. Cl. 43—4                                 6 Claims

ABSTRACT OF THE DISCLOSURE

Method and apparatus for improving fishing under a fishing dock includes an air compressor, a conduit extending from the air compressor and terminating in the water at a depth below the fishing dock, and an air diffuser on the end of the conduit for releasing the air from the compressor in small diffused bubbles. A heating element is supported at a depth in the water below the fishing dock and a conductor extends from the heating element to an electrical energy source, the heating element serving to heat the water below the fishing dock, and in conjunction with the diffused air bubbles, provides a convection current of water rising below the fishing dock. A thin impervious sheet extends downwardly from the periphery of the fishing dock serving to confine the convection current of water below the dock.

CROSS-REFERENCE

This application is not related to any pending United States or foreign application.

SUMMARY

A great deal of fishing done in the United States is done from fishing docks. This is particularly true of fishing done during cold or rainy weather wherein the fishermen may continue to fish while protected from such unpleasant weather. Fishing docks are typically supported on floating material on the surface of water and can range from very simple docks to very elaborate ones including areas for many people to fish. A typical fishing dock includes an opening in the dock floor, termed a fishing well, around which fishermen may sit or stand to fish.

This invention provides means for equipping improved fishing docks and for improving the fishing under existing fishing docks.

DESCRIPTION OF THE VIEW

The figure shows a fishing dock in cross section floating on water and shows the improved methods and devices of this invention.

DETAILED DESCRIPTION

A fishing dock invention is indicated generally by the numeral 10. The illustrated dock is of typical construction and includes a floor 12, walls 14, and a roof 16. Beneath the floor 12 are floatation devices 18 which may include air tight cylinders or drums or plastic type floatation equipment such as Styrofoam. Some fishing docks are supported by pilings and the methods and devices of the invention may be used with fishing docks regardless of the manner they are supported on or above the surface of the water.

In the center of the floor 12 is a fishing well (not shown) and around the well a railing 20.

The fishing dock described to this point is of typical construction and this construction may be varied in innumerable ways. The description up to this point forms no part of the novelty of the invention but, in contrast, the invention includes means of improving the fishing of those using the fishing dock.

Supported on the floor 12 is an air compressor 22 which may be powered by an electric motor, gasoline engine or the like. Extending from the compressor 22 is a conduit 24 which extends down and terminates at a depth in the water below the floor 12. At the lower end of the conduit 24 is a diffuser 26 which receives the air output from the compressor 22 by way of conduit 24. The diffuser 26 may be of a variety of constructions, such as by way of example, a hollow container having multiplicity of apertures therein, or a box filled with sand. The diffuser 26 may rest upon the bottom of the lake or other body of water on which the fishing dock floats, or, if the water is deep, the diffuser may be supported at a preselected depth below the floor 12. For best results the diffuser 26 should be at least 20 to 25 feet below the surface of water supporting the fishing dock.

Compressor 22 pumps air which passes through conduit 24 and is released by diffuser 26 as small diffused bubbles. These bubbles rise to the surface of the water beneath the fishing dock. The rising bubbles improve fishing in three basic ways. That is, they: (1) attract fish by the motion and activity of the bubbles; (2) the small bubbles being diffused air augment the oxygen content of the water and the fish, which depend upon such oxygen content, are attracted thereby; and (3) the rising bubbles cause a current of water to be moved upwardly underneath the dock, such current of water moving minnows, algae and other food particles with it and fish are thereby attracted by such improved food supply.

An additional embodiment of the invention includes a provision of a heating element 28 positioned below the fishing dock. The heating element 28 may be positioned in the same way as the air diffuser 26, that is, when the dock is over relatively shallow water the heating element 28 may be supported on the floor of the body of water or when the water depth is greater the heating element 28 may be supported at a preselected depth below the floor 12. As with the diffuser 26 the depth of the heating element 28 should be at least 20 to 25 feet below the surface of the water.

A conductor 30 extends from the heating element 28 to an energy outlet point 32 above the floor 12. By means of electrical energy carried by conductor 30 the heating element 28 is energized to heat the water coming into contact with it. The heating of the water below the fishing dock improves fishing in several ways. First, raising the temperature of water, particularly in the winter months, increases the activity of the fish. One or two degrees difference in water temperature drastically affects the activity of most species of fish. It must be remembered that the body of the fish is the same temperature of the water in which it exists. Thus raising the temperature of the water even a few degrees, simultaneously raises the body temperature of the fish swimming in the water and such few degrees difference drastically affects the activity of a fish. Whereas a fish may be lethargic at a cold temperature, a few degrees higher temperature may change the fish into an aggressive hungry fish which is attracted to any bait or lure in his vicinity. Second, the heat supplied to the water by heating element 28 causes a convection of warm water rising beneath the fishing dock which accomplishes the same purpose as previously described relative to the rising current of water caused by the release of diffused air bubbles. Thus the air bubbles released from diffuser 26 and the heating element 28 complement each other and provide an environment which attracts and makes fish more hungry and aggressive.

An additional element of this invention which improves a fishing dock is that of providing means for concentrating the effect of the heating and release of diffused air bubbles, which means includes positioning downwardly extending impervious sheets 34 around the periphery of the dock floor 12. Such sheets may be of plastic and may include means at the lower ends thereof for maintaining the sheets in a downward position, such as rods 36. The sheets 34 extending around the full periphery of the floor 12 provide an enclosed water column which concentrates the effect of the release of air bubbles and heating below the dock to substantially increase the effectiveness of the upward current of water. The sheets 34 should extend from the floor 12 to a point either immediately above or below the diffuser 26 and heating element 28.

Openings 38 are provided of a size to let fish pass freely through the sheets.

The invention provides means of substantially improving fishing below a fishing dock. A combination of the three main elements, that is, the diffused air bubbles, the heated water, and the sheets concentrating the effect of the air bubbles and heated water below the dock are capable of improving the fishing conditions drastically below a fishing dock.

This invention includes, as its primary object, improving fishing by means of releasing diffused air bubbles at a depth in the water below the area wherein fish are sought. The invention may be used in a great variety of environments and the term fishing dock, as used herein includes public or private docks, piers, boat and boat houses, etc. The invention includes the advantage that the current of water produced by rising diffused air bubbles prevents freezing of the water at the surface, providing an opening for fishing during winter months in northern latitudes. The currents produced by the rising diffused air bubbles brings to the surface relatively warmer water in winter months and relatively cooler water in summer months, and in either case, improves the feeding environment of fish.

While this invention has been described with a certain degree of particularity it is manifest that many changes may be made in the details of construction and the arrangement of components without departing from the spirit and scope of this disclosure.

What is claimed:

1. A method of improving fishing under a fishing dock comprising the steps of:
    compressing air;
    conducting said compressed air to a water depth below said fishing dock; and
    releasing said compressed air as diffused bubbles which rise to the top of the water below said fishing dock.

2. A method of improving fishing under a fishing dock according to claim 1 including the steps of:
    heating the water by means for a submerged heater at a depth below said fishing dock whereby heated water and said diffused air bubbles produce a convection current of water moving upwardly under said fishing dock.

3. A method of improving fishing under a fishing dock according to claim 2 including:
    positioning means in the planes of the peripheral sides of said fishing dock to confine the convection current of water caused by diffused air bubbles and said heating means to the area below said fishing dock.

4. An improved fishing dock positioned on a body of water comprising:
    a fisherman supporting floor;
    means under said floor supporting said floor above the water;
    an air compressor mounted on said floor;
    a conduit extending from said air compressor and terminating in the water at a depth below said floor; and
    an air diffuser received on the end of said conduit for releasing the air from said air compressor in small diffused bubbles.

5. An improved fishing dock according to claim 4 including:
    an electric heating element supporting at a depth in the water below said floor;
    a conductor extending from said heating element to a point above said floor; and
    electrical energy means connected to said conductor above said floor, said heating means serving to heat the water below said fishing dock whereby heated water and said diffused air bubbles produce a convection current of water moving upwardly under said fishing dock.

6. An improved fishing dock according to claim 5 including:
    thin impervious sheets extending downwardly from the periphery of said floor, said sheets serving to confine the convection current of water caused by diffused air bubbles and heating means to the area below said fishing dock, said sheets having at least one opening of a size permitting fish to pass therethrough.

References Cited

UNITED STATES PATENTS

| | | | |
|---|---|---|---|
| 1,939,583 | 12/1933 | Welshausen | 119—5 X |
| 2,860,600 | 11/1958 | Cheney | 119—3 |
| 2,874,505 | 2/1959 | Cobile | 43—7 |
| 3,320,928 | 5/1967 | Smith | 43—57 X |

FOREIGN PATENTS

| | | |
|---|---|---|
| 622,851 | 5/1949 | Great Britain. |
| 54,817 | 6/1935 | Norway. |

WARNER H. CAMP, Primary Examiner

U.S. Cl. X.R.

43—4.5